Patented Mar. 3, 1925.

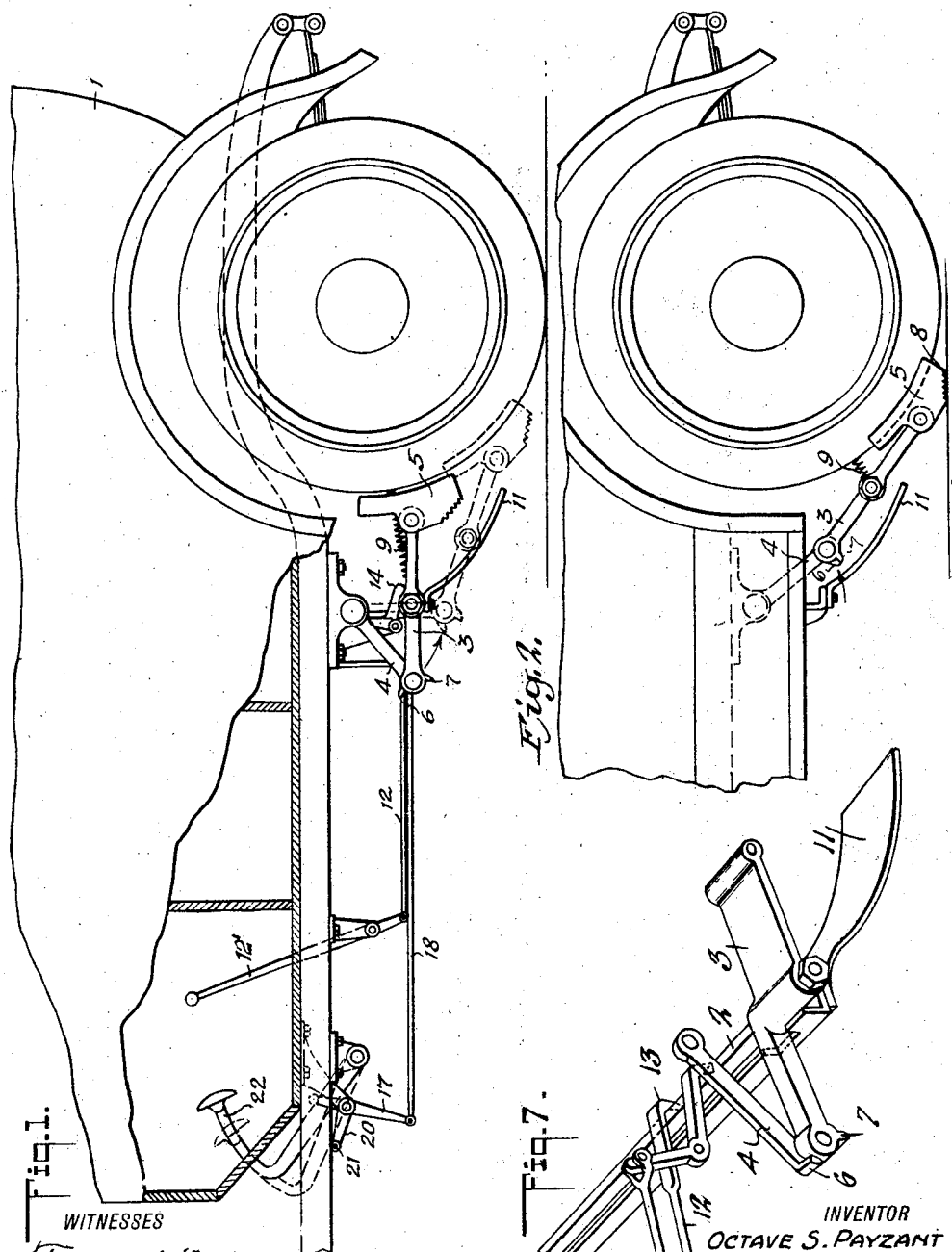

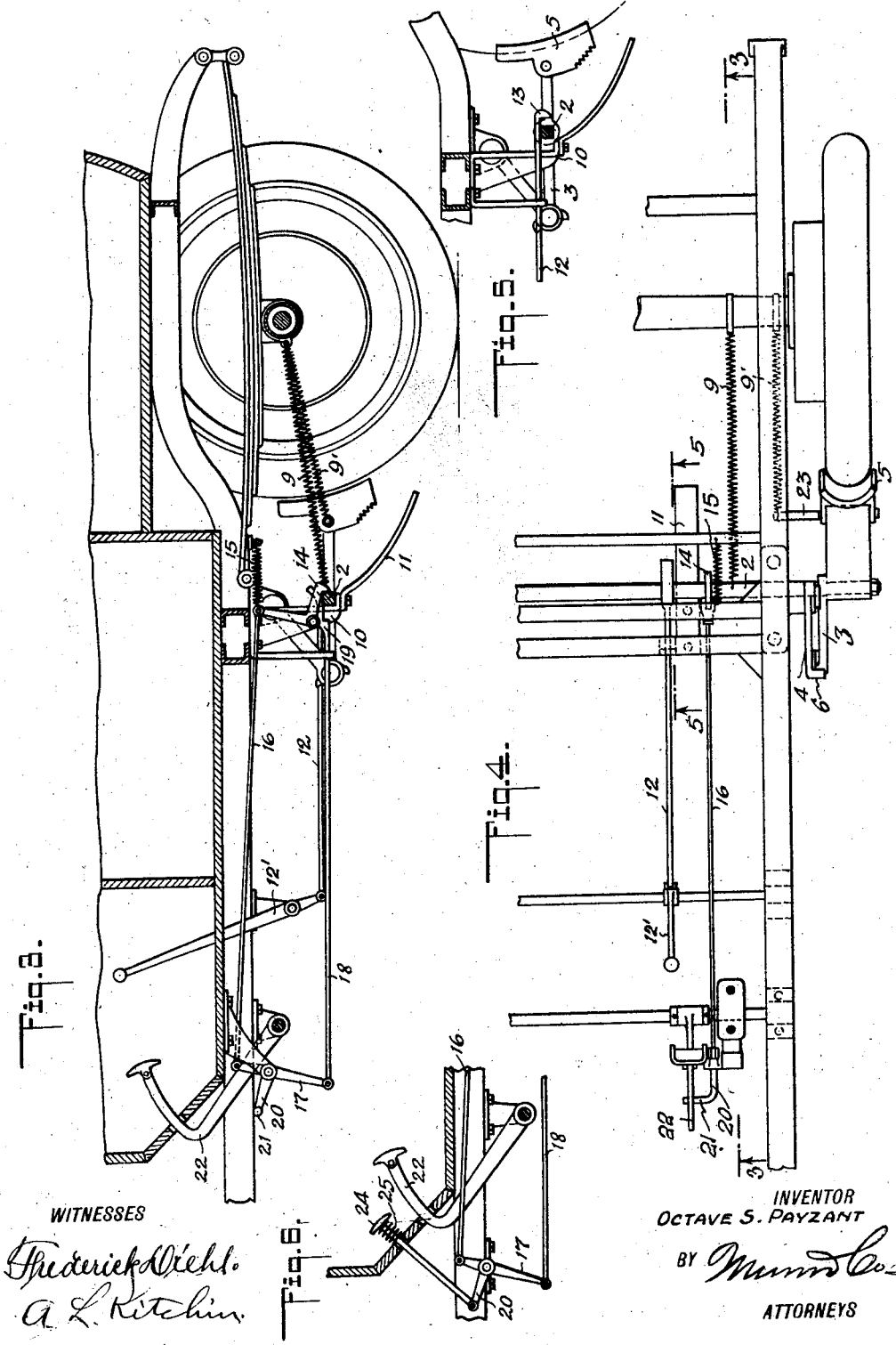

1,528,025

UNITED STATES PATENT OFFICE.

OCTAVE S. PAYZANT, OF NEW YORK, N. Y.

AUTOMOBILE CHOCK BRAKE.

Application filed March 5, 1923. Serial No. 623,038.

*To all whom it may concern:*

Be it known that I, OCTAVE S. PAYZANT, a citizen of the United States, and a resident of the city of New York, borough of Manhattan, in the county and State of New York, have invented a new and Improved Automobile Chock Brake, of which the following is a full, clear, and exact description.

This invention relates to vehicle brakes and particularly to a chock block or brake for automobiles and has for an object to provide an improved simplified construction which may be quickly and easily moved to an operative position and also quickly and easily moved back to an inoperative position.

Another object of the invention is to provide a chock brake for automobiles and other vehicles wherein any suitable operating mechanism may be used for applying a chock to the wheels, as for instance, the usual clutch or brake operating mechanism.

A further object of the invention is to provide a chock brake or block for automobile wheels designed to be used in emergency and connected up with manually actuated parts which do not interfere with the usual control mechanism of the automobile and which merely acts as a continuation of said mechanism so as to be operated after the operation of said mechanism.

A still further object of the invention is to provide means for actuating the operation of the braking device which must be operated by means or through the medium of the motion of the usual clutch or brake foot pedals or other usual stopping mechanism of the automobile.

In the accompanying drawings—

Figure 1 is a fragmentary side view of the rear part of an automobile with certain parts broken away and showing in connection therewith a chock brake embodying the invention.

Figure 2 is a view similar to Figure 1 showing the brake in its operated position.

Figure 3 is a sectional view through Figure 4 approximately on line 3—3.

Figure 4 is a fragmentary top plan view of the lower part of Figure 1 and illustrating one side of the chock brake embodying the invention.

Figure 5 is a fragmentary sectional view through Figure 4 on line 5—5.

Figure 6 is a fragmentary sectional view similar to the front part of the structure shown in Figure 3 but illustrating a slightly modified construction.

Figure 7 is a detail fragmentary perspective view showing the central lower portion of the structure illustrated in Figures 1 and 2.

Referring to the accompanying drawings by numerals, 1 indicates an automobile of any desired kind which is provided with the usual driving and braking mechanism including the usual controlling levers or other mechanism. In the ordinary automobile brake, devices of certain kinds are provided for braking the rear wheels but under some circumstances these fail to entirely stop the rotation of the wheels and when they do function to stop the rotation of the wheels, the small contacts of the wheels with the ground permit the wheels to slide for an undesirable distance. To obviate this and to cause a quick stop to the automobile in view of accident or for any other reason, a special chock brake has been provided which acts on the rear wheels and also acts in conjunction therewith. In mounting the invention on the automobile 1, it will be understood that a brake shoe and certain associated parts will be arranged opposite each of the rear wheels and connected together so as to be controlled by a single control member at the front of the automobile. Therefore, the showing in the accompanying drawings which illustrates one side of the automobile will apply to both sides.

As illustrated in the drawing, there is provided a cross bar 2 which is preferably rectangular in shape and which is connected to the braking mechanism on both sides of the car and to the single control mechanism between the sides. The end of the bar 2 is rigidly secured by a nut or otherwise to the center of a rigid link 3, which link at one end is pivotally connected to an auxiliary link 4 and the opposite end pivotally connected with a shoe 5. The link 4 is pivotally supported at its upper end by a suitable bracket secured to the automobile 1. Preferably, the auxiliary link 4 is provided with a projection 6 and the link 3 with a co-acting projection 7 which prevent the links 3 and 4 from forming a straight line and thereby resist movement from the position shown in Figure 2 to the position shown in Figure 1.

The shoe 5 may be of any desired kind but is preferably formed of an arc-shaped cavity adapted to receive the tire of a rear wheel and with a roughened earth contacting surface 8. A spring 9 is connected to the bar 2 near the respective links 3 on the opposite sides of the car and to the axle of the car as shown in Figure 4 so as to pull said links toward the wheel whenever the parts are released. When the parts are in the position shown in Figure 1 and are suddenly released, spring 9 will pull the link 3 and shoe 5 directly toward the rear wheel and as soon as the shoe presses against the rear wheel it will automatically move down to the position shown in Figure 2 if the rear wheel is rotating. When the parts are in their operated position as shown in Figure 2 the rear part of the automobile is raised slightly and is supported by the shoe 5 which quickly stops the forward movement of the automobile. When it is desired to re-set the parts, the rear wheels are reversed and as soon as a reverse rotation takes place the wheels will roll down off of the shoe 5 and will move said shoe upwardly until the link 3 is substantially in a horizontal position. Certain parts hereinafter described will then be operated for pulling the link 3 and shoe forwardly to the position shown in Figure 1.

Ordinarily, the parts are carried in the position shown in Figures 1 and 3 wherein the bar 2 is resting in an L-shaped bracket 10, which bracket carries an arc-shaped depending guide 11 designed to guide the bar back to the position shown in Figure 1 when the parts are being moved from an operative to an inoperative position. In Figure 5 the bar 2 and associated parts are shown moved back by the wheel. In order to cause the bar 2 to seat itself in the L-shaped bracket 10, a rod 12 is pulled, said rod having a hook end 13 (Fig. 5) designed to engage the bar 2 and move the same forwardly the proper distance. This forward movement will cause the bar 2 to move into the bracket 10 and also will pull the link 3 and shoe 5 away from the wheel. The rod 12 is pivotally connected at its forward end with the lower end of lever 12', which lever in turn is pivotally mounted on a suitable bracket carried by the automobile 1, said lever being manually actuated to shift the rod 12 and move the bar 2 to its correct position on the bracket 10. As soon as the bar 2 is moved to its correct position on the bracket 10, the hook 14 will move into the position shown in Figure 3 under the action of spring 15. This hook is pivotally mounted on a suitable bracket carried by the automobile and is disengaged from the bar 2 by a forward movement of the rod 16, which rod at its forward end is pivotally connected to the upper end of the lever 17, which lever is pivotally mounted intermediate its length on a suitable bracket carried by the automobile. The lever 17 at its lower end is pivotally connected with a rod 18 which rod is an ejector or push rod provided with a shoulder 19 normally spaced from the bar 2 as shown in Figure 3 whereby when said bar 18 is moved it must take up the space between the shoulder 19 and the bar before it can push the bar 2 off of the bracket 10. An arm 20 is rigidly secured to lever 17 at its pivotal point, said arm carrying an outwardly projecting pin 21 arranged in the path of movement of the clutch pedal 22. It is, of course, understood that the pin 21 could be arranged in the path of movement of some other actuated control mechanism of the car. The pin 21 is set at such a distance from the pedal 22 that said pedal may be freely operated for throwing out the clutch without striking the pin 21 but in case of an emergency and the clutch is thrown out quickly and the pedal pushed down to the limit of its movement, said pedal will strike the pin 21 and swing the same downwardly which will result in swinging the lever 17 and thereby simultaneously pulling rod 16 and pushing rod 18. This action will cause the hook 14 to move away from the bar 2 and a little later will cause the shoulder 19 and rod 18 to push the bar 2 off of the bracket 10 which movement is assisted by the spring 9 and also by an auxiliary spring 9' connected to the axle of the automobile in any desired manner and to a pin 23 secured preferably to the pivotal pin which connects the brake shoe or chock 5 with the link 3. As soon as the hook 14 releases the bar 2, not only will the rod 18 act to push the same off of the bracket 10 but the springs 9 and 9' will act to pull the parts to the position shown in Figure 5 and then the rotation of the wheel will cause the chock or shoe 5 to move quickly downwardly to the position shown in Figure 2.

After the automobile has been stopped and it is desired to start the same, the rear wheels are reversed and, consequently, they will roll off the chocks 5 and will then raise said chocks upwardly to the position shown in Figure 5 after which lever 12' is manually operated for moving bar 2 back to its seat on the bracket 10 whereupon hook 14 will snap into its operative position under the action of spring 15. The parts are then in their normal inoperative position and the automobile may proceed either forwardly or backwardly without in any way affecting the special chock braking mechanism.

In Figure 6 a slightly modified construction is provided for causing a disengagement of the hook 14 and bar 2. In this form of the invention, instead of the pedal 22 operating these parts when moved to an extra forward position, a special pin 24 is provided which is normally held in an elevated position by the spring 25, said pin being connected pivotally with the outer end of the arm 20 whereby the lever 17 is rocked whenever the pin 24 is depressed which cannot be done except by first moving the pedal 22 forwardly, permitting the foot to reach the pin 24.

What I claim is:—

1. An automobile chock brake, comprising a chock shoe for each of the rear wheels of an automobile, means for normally holding said chock shoes out of engagement with the rear wheels of the automobile, means actuated by certain of the usual controlling mechanism of the automobile for releasing the first mentioned means, and springs for moving said chock shoes into engagement with the rear wheels of the automobile.

2. An emergency brake mechanism for vehicles, comprising a brake shoe adapted to be engaged by the rear wheels of a vehicle and moved to a position against the ground in operation, a pair of pivotally connected links for each shoe, one link being connected to the respective shoes, a transverse bar rigidly secured to one link of each pair and extending across the vehicle, a supporting bracket for said bar positioned to cause said bar to hold the links and shoes in an inoperative position, a catch for holding said bar in said support, spring means for moving said bar and shoes away from said support and the shoes against the periphery of said wheels, and means operated by the operator for disengaging said catch.

3. An emergency brake mechanism for automobiles, comprising a chock brake shoe for each of the rear wheels of an automobile, a pair of pivotally connected links supporting each of the brake shoes, one link of each pair being pivotally supported by the automobile, a transverse bar rigidly secured to the other links of each pair, a support for said bar, a catch for normally holding said bar in said support, means actuated by certain of the control mechanism of the automobile for disengaging said catch and then moving the bar off of its support, and spring means acting to force said shoes against the rear wheels of the automobile whereby as the rear wheels continue to rotate the shoes will move down to the ground and beneath the wheels.

4. An emergency brake mechanism for automobiles, comprising a chock brake shoe for each of the rear wheels of an automobile, means for normally holding the brake shoes out of engagement with said wheels, spring means for moving the brake shoes into engagement with said wheels, a rod for releasing the means for holding the brake shoes out of engagement with the wheels of the automobile, a second rod for actuating said brake shoes toward an operated position, a pivotally mounted lever for actuating said rods, an arm secured to said lever and provided with a projection arranged in the path of movement of certain of the control mechanism of the automobile whereby when said control mechanism is moved to its extreme position in one direction the arm will be operated and said shoes will be released for chocking said rear wheels.

5. An emergency brake mechanism for automobiles, comprising a chock brake shoe for each of the rear wheels of an automobile, a jointed support for each of the brake shoes, said jointed support being pivotally connected with the brake shoes and also pivotally connected with the automobile, a spring associated with each of the brake shoes for moving the same into engagement with said wheels when permitted to do so whereby the wheels will move the brake shoes downwardly to the ground and substantially straighten said jointed support, a bar connecting the jointed support on one side of the machine with the jointed support on the opposite side, means including a catch for holding said bar and parts connected therewith in an inoperative position, and means operated by a pedal near the front of the automobile for releasing said bar and permitting the springs to move the brake shoes and associated parts to an operated position.

6. An emergency brake mechanism for automobiles, comprising a chock brake shoe for each of the rear wheels of an automobile, means including a spring for causing the brake shoes to press against said wheels and move therebeneath when shifted to an operated position and to move back to near an inoperative position when the automobile is backed, a manually actuated member for finishing the movement of said shoes back to an inoperative position, and manually actuated means for causing the brake shoes to start to function.

7. An emergency brake mechanism for automobiles, comprising a chock brake shoe for each of the rear wheels of an automobile, means for suspending said brake shoes on the automobile, manually actuated means for releasing said brake shoes, means including the wheels of the automobile for moving said brake shoes to a position in engagement with the ground and with said wheels, said brake shoes being resiliently held against said rear wheels so as to be raised thereby when the rear wheels are backed, and manually actuated means for moving said brake shoes to an inoperative position when raised by said rear wheels.

8. A chock brake for automobiles, comprising a chock shoe for each of the rear wheels of the automobile, means for holding said chock shoes in inoperative positions, means actuated by the usual clutch control pedal for releasing and then moving the chock shoes toward an operative position, and a spring for continuing the movement of said chock shoes until they engage the tires of the automobile.

OCTAVE S. PAYZANT.